Feb. 26, 1952     H. SEAMAN     2,587,538
SOLENOID VALVE
Filed Feb. 13, 1946
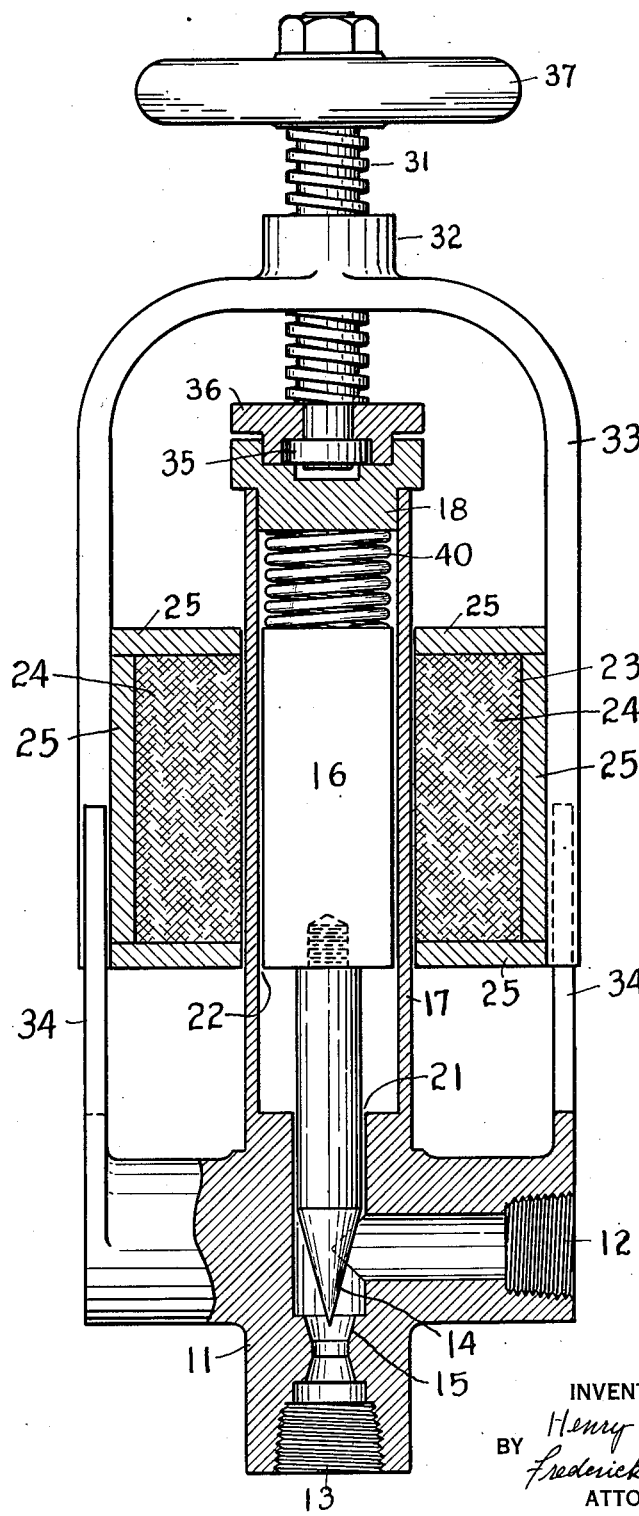
INVENTOR
Henry Seaman
BY Frederick G. L. Boyer
ATTORNEY Patented Feb. 26, 1952

2,587,538

UNITED STATES PATENT OFFICE 2,587,538

SOLENOID VALVE

Henry Seaman, Canton, N. C.

Application February 13, 1946, Serial No. 647,377

2 Claims. (Cl. 137—139)

This invention relates to valves for controlling the flow of fluids in pipes or conduits.

One object of the invention is to provide a valve structure which is totally enclosed and requires no packing or stuffing box to prevent leakage around the stem or other movable part. An allied object is the provision of a valve which is especially adapted to controlling the flow of poisonous, irritating, inflammable, explosive, or corrosive liquids or gases. Another object is to provide a valve structure which can be closed or opened to any desired degree by control of electric current through a solenoid. A further object is to provide a solenoid controlled valve which can be opened and closed without shock, water hammer, or the like. Other objectives and advantages of the invention will be apparent from the following detailed description.

For the accomplishment of these objects I completely enclose the movable valve stem within the valve housing, which for this purpose is provided with a closed tubular non-magnetic extension surrounded by a solenoid coil and containing the magnetic core of the solenoid, which is attached or otherwise operatively connected with the valve stem, to impart movement thereto for opening and closing the valve. If it is desired to hold the valve in a normally open or normally closed position when the solenoid is not energized I provide a spring within the housing for this purpose. I further provide means for adjusting the position of the solenoid along the tubular extension of the housing to correspondingly adjust the position in which the solenoid, when energized will hold the solenoid core and movable valve stem. This adjustment of the position of the solenoid can be utilized, if desired, to open and close the valve, or, when a spring is used to hold the valve in either a normally closed or normally open position, to adjust the degree to which the valve will be opened (or closed) when the solenoid is energized.

The invention will be further described with reference to the drawing, wherein the single figure is a view, partly in section, of a valve and operating devices made in accordance with the present invention, as embodied in a solenoid operating device for a needle valve. The valve body 11 is threaded at 12 and 13 for pipe connections in a usual manner. The opening and closing of the valve is accomplished by adjustment of the position of movable needle 14 relative to fixed seat 15. The valve stem or needle 14 is firmly fastened as by screwing to the magentic core 16 of the solenoid. The solenoid core 16 is totally enclosed within a tubular, nonmagnetic extension 17 of circular, rectangular or other cross section, formed integral with or attached by a leak proof joint to the valve housing 11. This extension is tightly closed at its upper end by a plug 18. Where the needle 14 passes through the valve housing there is a slight clearance at 21, while the solenoid core 16 fits with a similar clearance 22 in the housing extension 17.

A solenoid 23 is mounted with a free sliding fit over the outside of the non-magnetic extension 17 on the valve housing. The outside and ends of the windings 24 of the solenoid are clad with iron 25 which serves as a conductor of the lines of magnetic force.

For the purpose of adjusting the position of solenoid 23 along the housing extension 17 a screw 31 is provided which operates in a threaded hub 32 of a yoke 33 which is rigidly attached to the iron clad sides 25 of solenoid 23. Guides 34, which may be attached to valve body 11, are provided to prevent the yoke 33 from turning and constrain it to slide vertically when screw 31 is turned. Screw 31 is held in a fixed longitudinal position relative to the valve, by a head 35 thereon which is adapted to turn in a recess provided between head 18 of housing extension 17 and a collar 36 fastened thereto. A handwheel 37, or a gear or other operative connection to a source of power, may be provided for turning screw 31.

A spring 40 may be provided above the solenoid core 16 as shown in the drawing if it is desired to hold the valve in a closed position when the current is off, or, if it is desired to hold the valve in a normally open position the spring may be inserted below instead of above core 16.

With the apparatus as described, the solenoid when energized will hold the core 16 centered within itself as illustrated in the drawing, except that the spring 40, if present, may displace the core slightly until the magnetic force generated by the electric current through the solenoid balances the force of the spring. If the position of the solenoid is changed the position of the core 16 (and of valve stem or needle 14) will change correspondingly. It is thus possible to open, close, and adjust the opening of the valve by hand as in the case of the usual type of valve which requires a stuffing box around the stem. For this type of operation the spring 40 is unnecessary and may be omitted.

The valve can also be operated, if desired, in the manner of the usual type of solenoid valve, by positioning the solenoid in the open position.

The spring 40 will then hold the valve closed so long as no current flows through the solenoid. When the solenoid is energized the parts will be pulled to and held in the open position so long as the current continues to flow through the solenoid. If the spring 40 be placed below solenoid core 16 and the solenoid in the valve-closed position, the valve will be normally open and will be closed by energization of the solenoid.

By adjusting the position of the solenoid to any desired partly open position the valve can be operated as described by energizing and de-energizing the solenoid from a normally closed (or a normally open) position to the desired partial opening and returned to normal position. By turning the screw 31 it is possible to change the valve setting while the valve is in either the normally closed (or open) position or in the adjusted partly-open position.

The clearance 21 around valve stem 14, and clearance 22 around solenoid core 16 admit fluid from the valve chamber to the interior of housing 17 both above and below the solenoid core, at the same pressure, thus facilitating the adjustment. These clearances being small cause the imprisoned fluid to exert a damping action on the otherwise sudden movement of the parts when the solenoid is energized and de-energized, thus eliminating the shock, water hammer, etc. which are caused by sudden opening and closing as in the usual solenoid valves.

While the mechanism of the present invention has been illustrated and described as applied to a needle type valve, it will be readily understood that it can be applied with equal facility to valves of other types (e. g. globe, gate, slide, piston, etc.) which operate by a longitudinal movement of the valve element. It is also applicable to both balanced and unbalanced valves.

Though the solenoid core is shown as rigidly attached to the moving element of the valve, it may if desired be operatively connected therewith in a known manner by levers, cams, etc.

For the handling of corrosive liquids or gases the valve parts can be made of materials resistant to the corrosive action of the particular fluid to be handled. For this purpose the magnetic core 16 of the solenoid and the spring 40 can, if necessary, be plated or clad with a suitable corrosion resistant metal or coated with a suitable protective coating in accordance with known practices.

The total enclosure of all moving parts of the valve, as illustrated and described, serves to eliminate the need for stuffing boxes around moving parts, thereby eliminating friction and positively preventing escape of the fluid, thus giving the valve a particular value for controlling the flow of poisonous, inflammable, explosive, or corrosive liquids or gases. The adjustable positioning feature permits use of the valve for throttling or controlling the rate of fluid flow by variable opening of the valve, a function which can not be accomplished by the usual type of solenoid valve.

I claim:

1. A valve structure comprising: a housing having a fluid passage therethrough; a movable valve element adapted, by movement in one direction, to progressively reduce and finally close said passage, and, by movement in the opposite direction, to open said passage progressively wider until it is fully open, said element being completely enclosed within said housing; and means whereby said movable element can be operated from outside the housing, to open and close the valve to any desired degree, said means comprising a movable magnetic element completely enclosed within the housing and operatively connected with said movable valve element, a solenoid outside the housing and surrounding said movable magnetic element, a yoke attached to said solenoid, screw means operable to move said yoke relative to said housing and thereby to so position said solenoid that its magnetic force will hold said movable valve element in position to give any desired degree of valve opening from fully open to tightly closed.

2. A valve structure comprising: a housing with a fluid passage therethrough; a movable valve element adapted by movement in one direction to progressively reduce and finally close said passage, and by movement in the opposite direction, to open said passage progressively wider until it is fully open; a movable magnetic element operatively connected with said movable valve element; said movable valve and magnetic elements being sealed within said housing; a solenoid, outside said housing, adapted when energized to hold said movable magnetic and valve elements in position corresponding to the position of said solenoid relative to said housing; means for moving said solenoid so that, when energized it will hold said movable magnetic and valve elements in position to give any desired degree of valve opening from fully open to tightly closed; and a portion of said housing formed of non-magnetic material, to provide exteriorly thereof, guiding means for said solenoid, and to provide interiorly thereof, guiding means for said magnetic element, adapted to permit fluid from said passage to enter said housing portion and submerge said movable elements, and to provide sufficiently close clearances that said fluid imposes substantial resistance to rapid movement of said movable valve and magnetic elements and thereby prevents sudden closing of the valve.

HENRY SEAMAN.

REFERENCES CITED

The following references are of record in the file of this patent:

UNITED STATES PATENTS

| Number | Name | Date |
|---|---|---|
| 1,465,723 | West | Aug. 21, 1923 |
| 2,038,289 | Herbster | Apr. 21, 1936 |
| 2,039,089 | Koch | Apr. 28, 1936 |
| 2,335,350 | Mantle | Nov. 30, 1943 |
| 2,449,438 | Wisegarver | Sept. 14, 1948 |
| 2,536,813 | Jones | Jan. 2, 1951 |

FOREIGN PATENTS

| Number | Country | Date |
|---|---|---|
| 9,496 | Great Britain | of 1910 |